US009627988B2

(12) United States Patent
Lee et al.

(10) Patent No.: US 9,627,988 B2
(45) Date of Patent: Apr. 18, 2017

(54) SWITCH CONTROL CIRCUIT AND RESONANT CONVERTER INCLUDING THE SAME

(71) Applicant: FAIRCHILD KOREA SEMICONDUCTOR LTD., Bucheon-si (KR)

(72) Inventors: Won-Tae Lee, Cheonan-si (KR); Hyeong Seok Baek, Bucheon-si (KR); Ji-Hoon Jang, Incheon (KR); Hang-Seok Choi, Bedford, NH (US)

(73) Assignee: Fairchild Korea Semiconductor LTD. (KR)

( * ) Notice: Subject to any disclaimer, the term of this patent is extended or adjusted under 35 U.S.C. 154(b) by 0 days.

(21) Appl. No.: 14/614,605

(22) Filed: Feb. 5, 2015

(65) Prior Publication Data

US 2015/0229201 A1 Aug. 13, 2015

Related U.S. Application Data

(60) Provisional application No. 61/938,443, filed on Feb. 11, 2014.

(30) Foreign Application Priority Data

Jan. 15, 2015 (KR) .................... 10-2015-0007476

(51) Int. Cl.
*H02M 3/335* (2006.01)
*H02M 3/337* (2006.01)
(Continued)

(52) U.S. Cl.
CPC ........... *H02M 3/3376* (2013.01); *H02M 1/12* (2013.01); *H02M 3/33576* (2013.01);
(Continued)

(58) Field of Classification Search
CPC ...... H02M 1/088; H02M 3/156; H02M 3/158; H02M 3/33507; H02M 3/33569; H02M 3/33576; H02M 2001/0058
See application file for complete search history.

(56) References Cited

U.S. PATENT DOCUMENTS 6,366,070 B1 4/2002 Cooke et al.
8,624,572 B2 * 1/2014 Hosotani ........... H02M 3/33515
323/272

(Continued)

FOREIGN PATENT DOCUMENTS

CN 101677215 3/2010
CN 101728956 6/2010
CN 103138588 6/2013

*Primary Examiner* — Matthew Nguyen
(74) *Attorney, Agent, or Firm* — Grossman Tucker Perreault & Pfleger PLLC

(57) ABSTRACT

A resonant converter includes a primary-side winding electrically coupled to an input voltage, a secondary-side winding electrically coupled to a load, first and second switches coupled to one end of the primary-side winding, and a switch control circuit configured to differently control switching frequency limit ratios of the first and second switches by differently limiting a frequency variation ratio of a first clock signal that determines switching frequencies of the first and second switches according to variation of one of the input voltage and the load.

20 Claims, 4 Drawing Sheets

(51) Int. Cl.
*H02M 1/12* (2006.01)
*H02M 1/00* (2006.01)

(52) U.S. Cl.
CPC .. *H02M 2001/0058* (2013.01); *Y02B 70/1433* (2013.01); *Y02B 70/1491* (2013.01)

(56) References Cited

U.S. PATENT DOCUMENTS

| | | |
|---|---|---|
| 2003/0067794 A1 | 4/2003 | Boylan et al. |
| 2004/0105280 A1* | 6/2004 | Odaka ............... H02M 3/33576 363/16 |
| 2008/0055942 A1 | 3/2008 | Tao et al. |
| 2008/0186742 A1 | 8/2008 | Seong |
| 2009/0175056 A1 | 7/2009 | Choi |
| 2009/0196074 A1 | 8/2009 | Choi |
| 2009/0251925 A1 | 10/2009 | Usui et al. |
| 2010/0067262 A1 | 3/2010 | Chen et al. |
| 2010/0172157 A1 | 7/2010 | Chen et al. |
| 2011/0080757 A1* | 4/2011 | Young ................ H02M 3/3376 363/21.02 |
| 2011/0150521 A1 | 6/2011 | Uchiyama et al. |
| 2011/0211370 A1 | 9/2011 | Luo et al. |
| 2013/0336017 A1 | 12/2013 | Uno et al. |
| 2015/0023062 A1 | 1/2015 | Hyugaji et al. |

* cited by examiner

SWITCH CONTROL CIRCUIT AND RESONANT CONVERTER INCLUDING THE SAME

CROSS-REFERENCE TO RELATED APPLICATION

This application claims priority to and the benefits of U.S. Patent Application No. 61/938,443 filed in the USPTO on Feb. 11, 2014, and Korean Patent Application No. 10-2015-0007476, filed with the Korean Intellectual Property Office on Jan. 15, 2015, the entire contents of which are incorporated herein by reference.

BACKGROUND (a) Technical Field

Embodiment relates to a switch control circuit and a resonant converter including the same.

(b) Description of the Related Art

In resonant converters, a sub-harmonic may be caused due to variation of an input voltage. In addition, when a switching frequency is varied from a low frequency to a high frequency due to rapid variation of an output voltage according to load variation, a phenomenon in which a rate of on-duty variation rapidly increases may occur. This phenomenon causes sub-harmonic oscillation and makes signal detection for synchronous rectification difficult.

SUMMARY

Embodiment is directed to provide a switch control circuit for providing a frequency limit function so as to prevent a sub-harmonic and a resonant converter including the same.

According to an embodiment, a resonant converter includes: a primary-side winding electrically coupled to an input voltage; a secondary-side winding electrically coupled to a load; first and second switches coupled to one end of the primary-side winding; and a switch control circuit configured to differently control switching frequency limit ratios of the first and second switches by differently limiting a frequency variation ratio of a first clock signal that determines switching frequencies of the first and second switches according to variation of one of the input voltage and the load.

According to an embodiment, the switch control circuit includes: a half cycle signal generator configured to generate a half cycle signal according to a result of comparing a comparison voltage corresponding to an output voltage of the resonant converter to a first signal based on a current sense voltage according to a load of the resonant converter; and a frequency limit controller configured to differently limit a variation ratio of a frequency of the first clock signal according to a result of comparing a target on-time based on a first enable period in a previous switching cycle of a first clock signal for determining switching frequencies of the first and second switches to a first period from an enable start time point of the first clock signal to a point in time at which the half cycle signal is generated.

The frequency limit controller may generate a first frequency limit signal by multiplying the first enable period by a predetermined first limit ratio and generate a second frequency limit signal by multiplying the first enable period by a predetermined second limit ratio less than the first limit ratio, and the frequency limit controller may select the second frequency limit signal when the first period is shorter than the target on-time and select the first frequency limit signal when the first period is longer than the target on-time.

The frequency limit controller may include: a target on-time generator configured to generate a target on-time signal corresponding to the target on-time by multiplying a first count signal corresponding to the first enable period by a predetermined first ratio; a digital comparator configured to select one of first and second frequency limit modes according to a result of comparing a second count signal corresponding to the first period to the target on-time signal; and a frequency limit signal generator configured to generate the first and second frequency limit signals by multiplying the first count signal by the first limit ratio and the second limit ratio and output a frequency limit signal by selecting one of the first and second frequency limit signals according to the selected frequency limit mode.

The target on-time generator may update the target on-time signal for at least every switching cycle. The frequency limit signal generator may update the frequency limit signal for at least every switching cycle.

The switch control circuit may further include: a clock signal generator configured to generate the first and second count signals by counting the first enable period and the first period, respectively and generate the first clock signal according to one of the half cycle signals and the frequency limit signal.

The clock signal generator may determine an enable period of the first clock signal as a period based on the frequency limit signal when the first period is shorter than the period based on the frequency limit signal.

The frequency limit controller may generate a frequency limit signal according to a selected mode of first and second frequency limit modes according to the result of comparing the target on-time to the first period, and the frequency limit controller may control an enable period of the first clock signal to a limit period or more based on the frequency limit signal.

The frequency limit controller may select the first frequency limit mode when the first period is longer than the target on-time and select the second frequency limit mode when the first period is shorter than the target on-time, and a first limit period based on a frequency limit signal according to the first frequency limit mode may be longer than a second limit period based on a frequency limit signal according to the second frequency limit mode.

The frequency limit controller may generate a frequency limit signal by multiplying the first enable period by a first limit ratio corresponding to the first limit period and generate a frequency limit signal by multiplying the first enable period by a second limit ratio corresponding to the second limit period.

The half cycle signal generator may generate the half cycle signal at a point in time at which the first signal has reached the comparison voltage.

According to the above-described embodiment, it is possible to provide a switch control circuit for providing a frequency limit function so as to prevent a sub-harmonic and a resonant converter including the same.

DETAILED DESCRIPTION OF THE EMBODIMENTS

Figure 1:
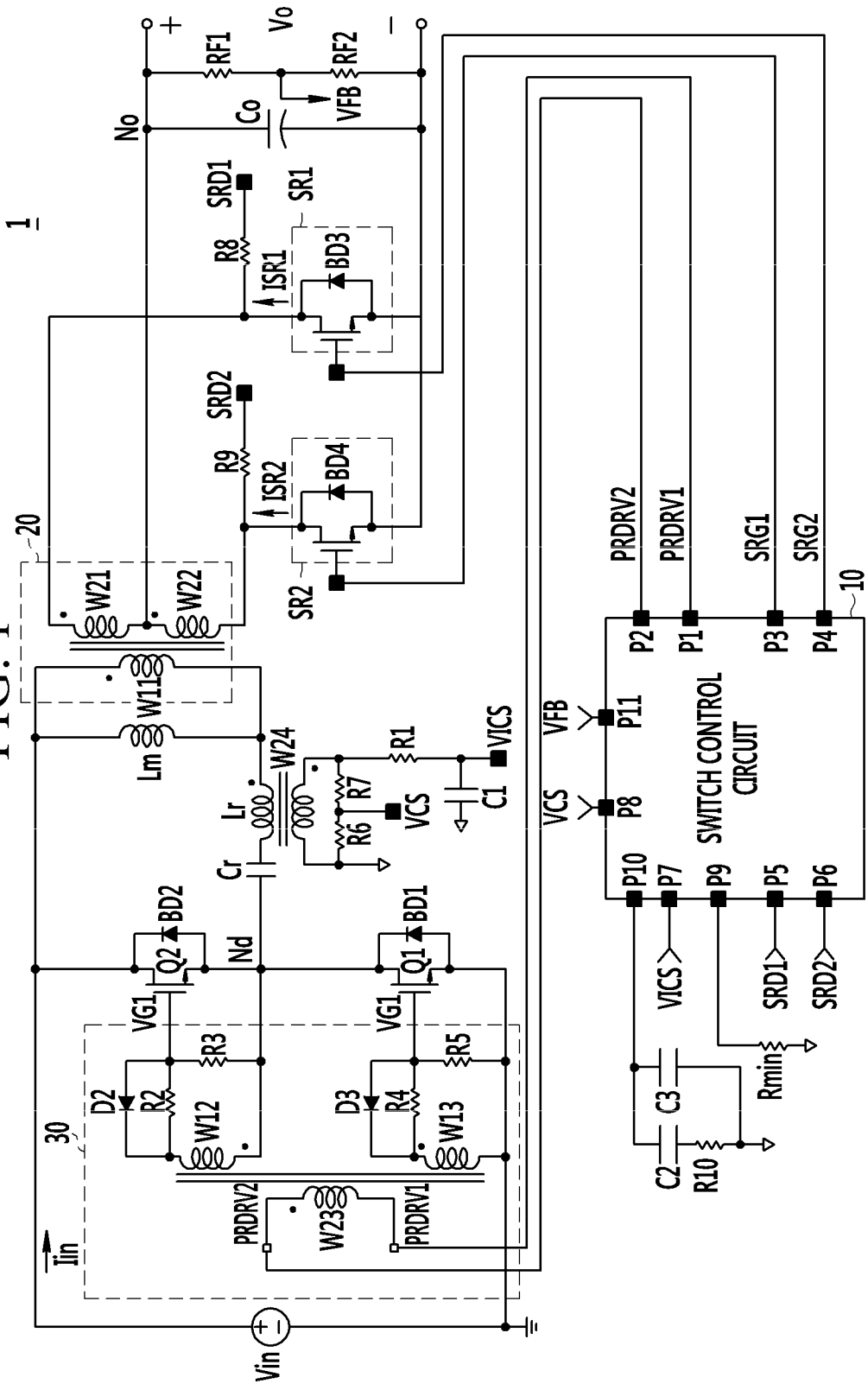
FIG. 1 is a diagram illustrating a resonant converter according to an embodiment.

Hereinafter, the present invention will be described in detail with reference to the accompanying drawings to allow those of ordinary skill in the art to easily carry out the present invention. However, embodiments of the invention may be implemented in various different forms, and the invention is not limited to the embodiments. To facilitate the entire understanding of the invention, the same reference numerals in the drawings denote the same elements, and elements which are not related to the description of the invention are omitted.

Throughout the specification, when it is described that one element is coupled (or connected) to the other element, the one element may be directly coupled (or connected) to the other element or electrically coupled (or connected) to the other element through a third element. Furthermore, when it is described that one element includes (or comprises) another element, it means that the one element does not exclude another element, but may further include other elements, unless otherwise described.

FIG. 1 is a diagram illustrating a resonant converter according to an embodiment.

The resonant converter illustrated in FIG. 1 is a half-bridge LLC (abbreviation of two resonant inductors L and one resonant capacitor C) resonant converter. A converter to which the present invention is applicable is not limited thereto.

The resonant converter 1 includes a first switch Q1, a second switch Q2, a transformer 20, a gate drive circuit 30, a first synchronous rectification switch SR1, a second synchronous rectification switch SR2, and a switch control circuit 10.

According to switching operations of the first switch Q1 and the second switch Q2, power supply of the resonant converter 1 is controlled. A body diode BD1 is formed between a drain and a source of the first switch Q1, and a body diode BD2 is formed between the drain and the source of the second switch Q2.

The second switch Q2 and the first switch Q1 are connected in series between an input voltage Vin and the primary-side ground, and the second switch Q2 and the first switch Q1 are alternately switched, respectively. The second switch Q2 is turned off, and the first switch Q1 is turned on after a first dead time. The first switch Q1 is turned off, and the second switch Q2 is turned on after the first dead time.

The drain of the second switch Q2 is connected to the input voltage Vin, the source of the second switch and the drain of the first switch Q1 are connected to a node Nd, and the source of the first switch Q1 is connected to the primary-side ground. A gate voltage VG1 is supplied to the gate of the first switch Q1 and a gate voltage VG2 is supplied to the gate of the second switch Q2. The first switch Q1 and the second switch Q2 are alternately switched, and power supply is controlled according to the switching operation. For example, the power supply increases as the switching frequencies of the first switch Q1 and the second switch Q2 decrease, and the power supply decreases as the switching frequencies increase.

A capacitor Cr, a primary-side winding W1 of the transformer 20, and an inductor Lr are connected in series between the input voltage Vin and the node Nd. Resonance occurs among the capacitor Cr, the primary-side winding W1, and the inductor Lr, and a current Iin input to a primary side is controlled with sinusoidal waves according to the resonance.

On a secondary side of the transformer 20, windings W21 and W22 are coupled to the primary-side winding W11 at a predetermined winding ratio according to insulated coupling. The first synchronous rectification switch SR1 is connected to one end of the secondary-side winding W21, and a body diode BD3 is formed between the drain and the source of the first synchronous rectification switch SR1. The second synchronous rectification switch SR2 is connected to one end of the secondary-side winding W22, and a body diode BD4 is formed between the drain and the source of the second synchronous rectification switch SR2.

Hereinafter, if the current flows through the first and second synchronous rectification switches SR1 and SR2, this means that the first and second synchronous rectification switches SR1 and SR2 are turned on to cause the current to flow and the current flows through the body diodes BD3 and BD4.

The source of the first synchronous rectification switch SR1 is connected to the secondary-side ground, the drain of the first synchronous rectification switch SR1 is connected to the one end of the secondary-side winding W21, and a first SR gate voltage SRG1 is input to the gate of the first synchronous rectification switch SR1. The source of the second synchronous rectification switch SR2 is connected to the secondary-side ground, the drain of the second synchronous rectification switch SR2 is connected to the one end of the secondary-side winding W22, and a second SR gate voltage SRG2 is input to the gate of the second synchronous rectification switch SR2.

The other end of the secondary-side winding W21 and the other end of the secondary-side winding W22 are connected to an output node No, and a capacitor Co is connected between the output node No and the secondary-side ground. A voltage of the output node No is an output voltage Vo. The output node No is connected to a load (not illustrated).

The body diode BD3 is conductively connected by the current flowing through the secondary-side winding W21, and the first synchronous rectification switch SR1 is turned on. Then, the current of the secondary-side winding W21 is rectified through the first synchronous rectification switch SR1 and flows through the capacitor Co. Hereinafter, the current flowing through the first synchronous rectification switch SR1 is referred to as a first synchronous rectification current ISR1.

The body diode BD4 is conductively connected by the current flowing through the secondary-side winding W22, and the second synchronous rectification switch SR2 is turned on. Then, the current of the secondary-side winding W22 is rectified through the second synchronous rectification switch SR2 and flows through the capacitor Co. Hereinafter, the current flowing through the second synchronous rectification switch SR2 is referred to as a second synchronous rectification current ISR2.

The first and second synchronous rectification currents ISR1 and ISR2 may be supplied to the load, or the capacitor Co may be charged with the first and second synchronous rectification currents ISR1 and ISR2. The ripple of the output voltage Vo is attenuated by the capacitor Co.

The gate drive circuit 30 includes a secondary-side winding W23, two primary-side windings W12 and W13, four resistors R2 to R5, and two diodes D2 and D3.

A first drive voltage PRDRV1 is input to one end of the secondary-side winding W23, and a second drive voltage PRDRV2 is input to the other end of the secondary-side winding W23. The resistor R2 and the diode D2 are connected in parallel between the one end of the primary-side winding W12 and the gate of the second switch Q2, and the other end of the primary-side winding W12 is connected to one end of the resistor R3 and the node Nd. The resistor R2, the resistor R3, and an anode of the diode D2 are connected to the gate of the second switch Q2. The resistor R4 and the diode D3 are connected in parallel between the one end of the primary-side winding W13 and the gate of the first switch Q1. The other end of the primary-side winding W13 is connected to one end of the resistor R5 and the primary-side ground. The resistor R4, the resistor R5, and the anode of the diode D3 are connected to the gate of the first switch Q1.

The first switch Q1 is switched according to the gate voltage VG1, and the second switch Q2 is switched according to the gate voltage VG2. Because the first switch Q1 and the second switch Q2 are n-channel transistors, an enable level of each of the gate voltage VG1 and the gate voltage VG2 is a high level, and a disable level thereof is a low level.

When the first drive voltage PRDRV1 has the high level and the second drive voltage PRDRV2 has the low level, the current of the primary-side winding W12 flows through the resistor R3 and the diode D2, and the current of the primary-side winding W13 flows through the resistor R4 and the resistor R5. Then, the gate voltage VG1 is formed as a high-level voltage capable of turning on the first switch Q1, and therefore the first switch Q1 is turned on. The gate voltage VG2 becomes a voltage lower than the source voltage of the second switch Q2, and therefore the second switch Q2 is turned off.

When the second drive voltage PRDRV2 has the high level and the first drive voltage PRDRV1 has the low level, the current of the primary-side winding W12 flows through the resistor R2 and the resistor R3, and the current of the primary-side winding W13 flows through the resistor R5 and the diode D3. Then, the gate voltage VG2 is formed as a high-level voltage capable of turning on the second switch Q2, and therefore the second switch Q2 is turned on. The gate voltage VG1 becomes a voltage lower than the source voltage of the first switch Q1, and therefore the first switch Q1 is turned off.

When an input current Iin flows through the inductor Lr, the current is induced in the secondary-side winding W24, and a sense voltage VCS is generated. For example, when the input current Iin flows toward the node Nd by resonance, the current of the secondary-side winding W24 flows through the secondary-side ground through the resistors R7 and R6. Then, the positive sense voltage VCS corresponding to the input current Iin is generated. When the input current Iin flows in an outgoing direction from the node Nd by resonance, the current of the secondary-side winding W24 flows through the resistors R6 and R7 from the secondary-side ground. Then, a negative sense voltage VCS corresponding to the input current Iin is generated. The sense voltage VCS is supplied to the switch control circuit 10 though a pin P8, and the switch control circuit 10 may sense the overcurrent using the sense voltage VCS.

The resistor R1 is connected to one end of the secondary-side winding W24, the other end of the resistor R1 is connected to one end of the capacitor C1 and a pin P7, and the other end of the capacitor C1 is connected to the secondary-side ground. A voltage corresponding to a current flowing to the secondary-side winding W24 though an RC filter constituted of the resistor R1 and the capacitor C1 is integrated, and an integration result is information corresponding to a current (hereinafter referred to as load current) supplied to the load. Hereinafter, the integration result is referred to as a current sense voltage VICS as a voltage for sensing the load.

The switch control circuit 10 includes a pin P1 from which the first drive voltage PRDRV1 is output, a pin P2 from which the second drive voltage PRDRV2 is output, a pin P3 from which the first gate voltage SRG1 is output, a pin P4 from which the second gate voltage SRG2 is output, a pin P5 to which a first drain voltage SRD1 is input, a pin P6 to which a second drain voltage SRD2 is input, the pin P7 to which a current sense voltage VICS is input, the pin P8 to which the sense voltage VCS is input, a pin P9 connected to a resistor Rmin for determining a minimum switching frequency, a pin P10 to which a compensator is connected, and a pin P11 to which a feedback voltage VFB is input.

The pin P5 is connected to the drain of the first synchronous rectification switch SR1 through the resistor R8, and the pin P6 is connected to the drain of the second synchronous rectification switch SR2 through the resistor R9.

A compensator including the resistor R10, the capacitor C2, and the capacitor C3 is connected to the pin P10. The resistor R10 and the capacitor C2 connected in series are connected to the capacitor C3 in parallel. One end of the capacitor C2 and one end of the capacitor C3 are connected to the pin P10. One end of the resistor R10 is connected to the other end of the capacitor C2. The other end of the resistor R10, and the other end of the capacitor C3 are connected to the secondary-side ground.

The pin P11 is connected to a node connected to two resistors RF1 and RF2. The output voltage Vo is divided by the two resistors RF1 and RF2, and a feedback voltage VFB is generated.

The switch control circuit 10 generates an error voltage by amplifying a difference between the feedback voltage VFB and a predetermined reference voltage VR (see FIG. 2) and generates a comparison voltage COMP by compensating for the error voltage. The compensator connected to the pin P10 compensates for the error voltage. The switch control circuit 10 generates first and second clock signals CLK1 and CLK2 (see FIG. 2) for controlling the switching frequencies of the first and second switches Q1 and Q2, respectively.

For example, the switch control circuit 10 turns on the first switch Q1 when a dead time has elapsed from a rising edge of the first clock signal CLK1 and turns off the first switch Q1 at a falling edge of the first clock signal CLK1. The switch control circuit 10 turns on the second switch Q2 when a dead time has elapsed from a rising edge of the second clock signal CLK2 and turns off the second switch Q2 at a falling edge of the second clock signal CLK2. The first clock signal CLK1 and the second clock signal CLK2 are in anti-phase.

The switch control circuit 10 turns on the first synchronous rectification switch SR1 in synchronization with the turn-on of the first switch Q1, and turns on the second synchronous rectification switch SR2 in synchronization with the turn-on of the second switch Q2. The switch control circuit 10 causes each of the first and second synchronous rectification switches SR1 and SR2 to be maintained in an on state for a predetermined on-time and turned off.

For example, the switch control circuit 10 may determine an on-period of each of the first and second synchronous rectification switches SR1 and SR2 in a current cycle by subtracting a predetermined margin from a conduction period in an immediately previous switching cycle of each of the first and second synchronous rectification switches SR1 and SR2. The conduction period in the immediately previous switching cycle of each of the first and second synchronous rectification switches SR1 and SR2 refers to a period from a conduction time point of each of the diodes BD3 and BD4 connected to the first and second synchronous rectification switches SR1 and SR2 to a cutoff time point. Here, the predetermined margin may be a dead time of the first and second synchronous rectification switches SR1 and SR2.

Hereinafter, the switch control circuit according to an embodiment will be described with reference to FIG. 2.

Figure 2:
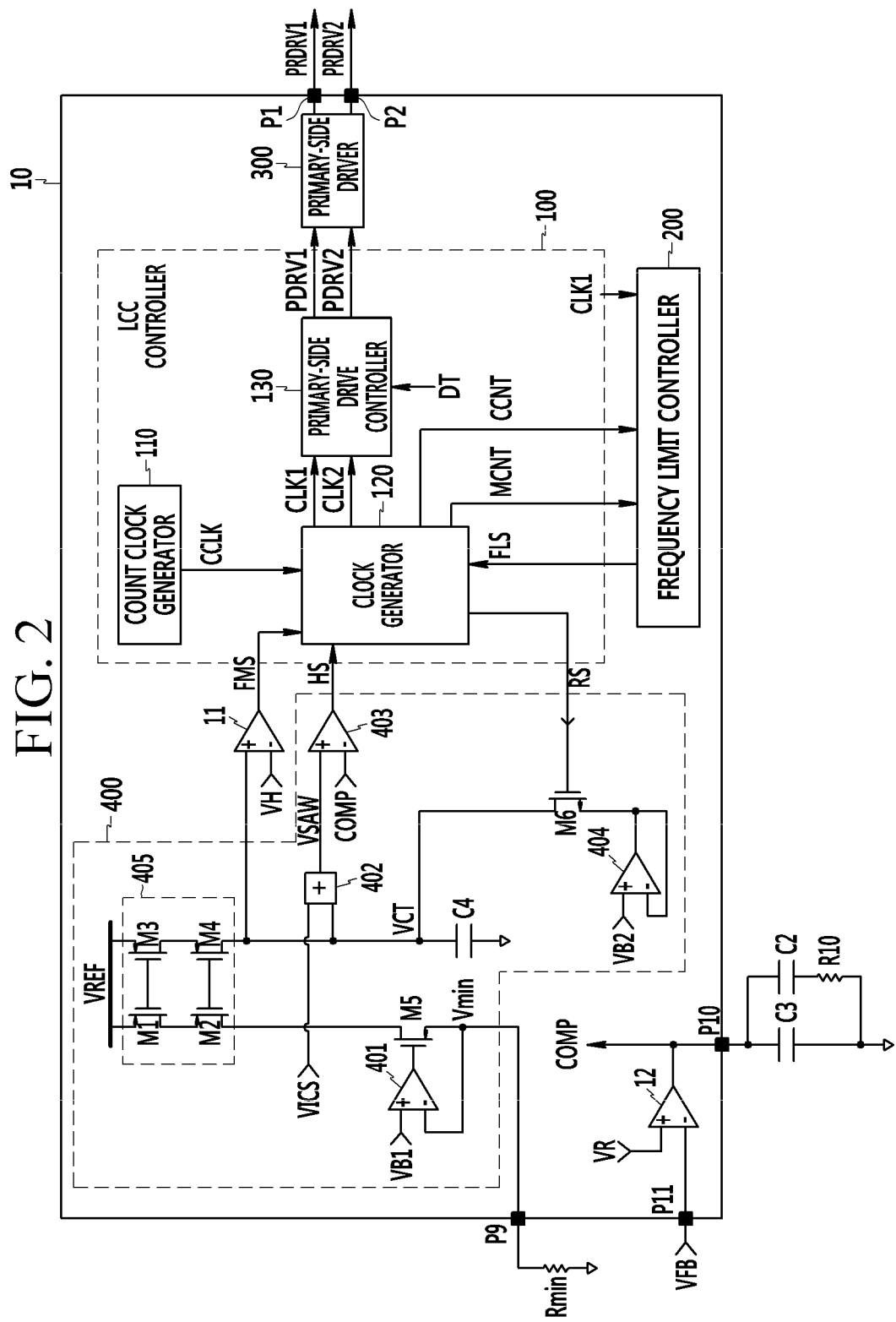
FIG. 2 is a diagram illustrating a switch control circuit according to an embodiment.

FIG. 2 is a diagram illustrating the switch control circuit according to the embodiment.

In FIG. 2, a configuration for controlling the primary-side switches of the switch control circuit 10 is illustrated. A specific configuration for controlling the secondary-side synchronous rectification switches may be appropriately designed to implement the above-described control scheme or another scheme.

A configuration of the switch control circuit for differently controlling a frequency limit which differs according to a frequency limit mode will be specifically described with reference to FIG. 2.

The switch control circuit 10 determines a target on-time based on a maximum on-time of a previous cycle of the first and second switches Q1 and Q2 and determines the frequency limit mode according to a result of comparing the target on-time to an on-time determined in the current cycle. The previous cycle may be prior to the current cycle by at least one cycle. In the embodiment, an immediately previous cycle is an example of the previous cycle, but the invention is not limited to such.

A maximum on-time refers to a maximum period in which each of the first switch Q1 and the second switch Q2 may be turned on without considering the dead time between the first switch Q1 and the second switch Q2. The on-time to be determined in the current cycle is an on-time when a degree of variation of the switching frequency is not limited.

The switch control circuit 10 differently controls a frequency limit ratio according to the determined frequency limit mode. The frequency limit ratio refers to a ratio at which the degree of variation of the switching frequency is limited. For example, when the frequency limit ratio is 10%, the switching frequency in the current cycle is limited to a switching frequency increased or decreased by 10% as compared to the switching frequency in the previous cycle.

The switch control circuit 10 controls the enable period (high level period) of the first clock signal CLK1, which is one of clock signals for determining the switching frequency, to a first limit period or more in the first frequency limit mode. Then, a frequency increase of the first clock signal CLK1 may be limited by the first limit period.

In addition, the switch control circuit 10 controls the enable period (high level period) of the first clock signal CLK1 to a second limit period or more in the second frequency limit mode. Then, a frequency increase of the first clock signal CLK1 may be limited by the second limit period.

At this time, when the second limit period is shorter than the first limit period, the frequency limit ratio in the second frequency limit mode is less than the frequency limit ratio in the first frequency time mode. That is, a switching frequency increase range in the second frequency limit mode may be greater than that in the first frequency limit mode.

In this manner, because the switching cycle of the resonant converter is controlled by the first clock signal CLK1, the switching frequency limit ratio differs according to whether the mode is the first or second frequency limit mode.

The switch control circuit 10 includes an LLC controller 100, a frequency limit controller 200, a primary-side driver 300, a half cycle signal generator 400, an upper limit comparator 11, and an error amplifier 12.

The frequency limit controller 200 receives inputs of a first count signal MCNT and a second count signal CCNT, generates a target on-time signal TOT based on the first count signal MCNT, determines the frequency limit mode according to a result of comparing the target on-time signal TOT to the second count signal CCNT, and generates a frequency limit signal FLS according to the determined frequency limit mode.

The first count signal MCNT may be a digital value representing a maximum on-time of an immediately previous cycle, and the second count signal CCNT may be a digital value representing an on-time of the current cycle. The second count signal CCNT is determined according to a point in time at which the half cycle signal HS is generated.

For example, the first count signal MCNT may be a result of counting the enable period of the first clock signal CLK1 of the immediately previous cycle, and the second count signal CCNT may be a result of counting a period from a rising time point of the first clock signal CLK1 of the current cycle to a point in time at which the half cycle signal HS is generated. The first and second count signals MCNT and CCNT may be generated by the LLC controller 100.

The frequency limit controller 200 may determine the target on-time based on the first count signal MCNT and determine the frequency limit mode according to a result of comparing the target on-time to the second count signal CCNT. The frequency limit controller 200 may generate the target on-time signal TOT representing the target on-time, compare a value of the target on-time signal TOT to a value of the second count signal CCNT, and determine the frequency limit mode according to a comparison result. Specifically, the frequency limit controller 200 may generate the target on-time signal TOT by multiplying the first count signal MCNT of the immediately previous cycle by a predetermined first ratio. That is, the target on-time signal TOT may also be a digital signal like the first and second count signals MCNT and CCNT.

The frequency limit controller 200 generates and outputs the frequency limit signal FLS according to the determined frequency limit mode. The frequency limit controller 200 determines the mode as the first frequency limit mode when the value of the target on-time signal TOT is greater than the value of the second count signal CCNT. Otherwise, the frequency limit controller 200 determines the mode as the second frequency limit mode. A frequency variation ratio limit of the first clock signal CLK1 in the second frequency limit mode is less than a frequency variation ratio limit of the first clock signal CLK1 in the first frequency limit mode.

For example, the frequency limit controller 200 may limit the maximum on-time of the current cycle to a value obtained by multiplying the first count signal MCNT by a predetermined first limit ratio in the first frequency limit mode. The first limit ratio may be determined according to the aforementioned first limit period. The frequency limit controller 200 may limit the maximum on-time of the current cycle to a value obtained by multiplying the first count signal MCNT by a predetermined second limit ratio less than the first limit ratio in the second frequency limit mode. The second limit ratio may be determined according to the aforementioned second limit period.

A specific configuration and operation of the frequency limit controller 200 will be described later with reference to FIGS. 3 and 4.

The LLC controller 100 determines frequencies of the first and second clock signals CLK1 and CLK2 according to the half cycle signal HS. At this time, the LLC controller 100 limits the enable period of the first clock signal CLK1 so that the enable period of the first clock signal CLK1 is not less than the maximum on-time set according to the frequency limit mode. Then, the frequency variation range of the first clock signal CLK1 is limited.

The half cycle signal generator 400 generates sawtooth waves VSAW and generates the half cycle signal HS according to a result of comparing a voltage of the sawtooth waves VSAW to the comparison voltage COMP. In synchronization with a rising time point of the first clock signal CLK1, the voltage VCT and the current sense voltage VICS start to increase. At a point in time at which the half cycle signal HS is generated, the first clock signal CLK1 may fall. As described above, the first clock signal CLK1 may fall when the maximum on-time set according to the frequency limit mode has elapsed if a generation time point of the half cycle signal HS is previous to a point in time at which the maximum on-time set according to the frequency limit mode has elapsed.

As illustrated in FIG. 2, the half cycle signal generator 400 includes a current mirror circuit 405, two error amplifiers 401 and 404, an adder 402, a comparator 403, a transistor M5, and a capacitor C4.

The error amplifier 401 and the transistor M5 operate as a voltage-current converter. An output terminal of the error amplifier 401 is connected to the gate of the transistor M5, an inversion terminal (−) of the error amplifier 401 and the source of the transistor M5 are connected, and the voltage VB1 is input to a non-inversion terminal (+).

The current flows through the transistor M5 so that a minimum voltage Vmin input to the inversion terminal (−) of the error amplifier 401 is the same as the voltage VB1 input to the non-inversion terminal (+). Because the minimum voltage Vmin is determined according to a current flowing through the resistor Rmin and the transistor M5, the current flowing through the transistor M5 may differ according to the resistor Rmin.

The current mirror circuit 405 includes four transistors M1 to M4. Each of the transistor M1 and the transistor M2 having the gate and the drain connected to each other operates like a diode. The transistors M1 and M2 are connected in series, and the transistors M3 and M4 are connected in series. The source of the transistor M1 and the source of the transistor M3 are connected to a voltage VREF, and the drain of the transistor M2 is connected to the drain of the transistor M5. The drain of the transistor M4 is connected to one end of the capacitor C4.

The current flowing through the transistor M5 is mirrored by the current mirror circuit 405 and supplied to the capacitor C4. Therefore, the capacitor C4 is charged, and the voltage VCT is increased.

The voltage VB2 is input to the non-inversion terminal (+) of the error amplifier 404, and the inversion terminal (−) is connected to the source of the transistor M6 along an output terminal. A reset signal RS is supplied to the gate of the transistor M6, and the drain of the transistor M6 is connected to the one end of the capacitor C4. The inversion terminal (−) and the output terminal of the error amplifier 404 are connected, and the voltage VB2 becomes an output of the error amplifier 404.

The reset signal RS is generated in synchronization with one of the first and second clock signals CLK1 and CLK2. The voltage VCT is maintained at a predetermined level during the enable period of the reset signal RS, and the voltage VCT increases with a given slope during the disable period of the reset signal RS.

For example, the reset signal RS is disabled in synchronization with a rising time point of the first clock signal CLK1 and enabled in synchronization with a rising time point of the second clock signal CLK2. During a period in which the transistor M6 is turned on, the voltage VCT is controlled to be the same as the voltage VB2. During a period in which the transistor M6 is turned off, the capacitor C4 is charged with the current supplied from the current mirror circuit 405, and the voltage VCT increases with a given slope.

The adder 402 generates sawtooth waves VSAW by adding the voltage VCT to the current sense voltage VICS.

The comparator 403 generates the half cycle signal HS according to a result of comparing the comparison voltage COMP to a voltage of the sawtooth waves VSAW. When the comparison voltage COMP is input to the inversion terminal (−) of the comparator 403, and the sawtooth waves VSAW are input to the non-inversion terminal (+).

The sawtooth waves VSAW are one example of a plurality of signals generated to control a switching frequency. A signal corresponding to a load current may be used in place of the sawtooth waves VSAW. For example, when the current sense voltage VICS is compared to the comparison voltage COMP, the half cycle signal HS may be generated according to the comparison result.

The comparison voltage COMP may be a voltage generated by amplifying a difference between the voltage corresponding to the output voltage Vo and a predetermined reference voltage according to a predetermined gain. When the voltage of the sawtooth waves VSAW reaches the comparison voltage COMP while the voltage of the sawtooth waves VSAW increases, the comparator 403 generates a high-level half cycle signal HS.

The upper limit comparator 11 outputs a result of comparing the voltage VCT to a predetermined threshold voltage VH. According to an output signal FMS of the upper limit comparator 11, a minimum frequency of the first and second clock signals CLK1 and CLK2 may be determined. For example, according to a period in which the voltage VCT reaches the threshold voltage VH, the minimum frequency of the first and second clock signals CLK1 and CLK2 is determined, and a minimum operation frequency of the resonant converter 1 is determined.

The error amplifier 12 generates an error voltage by amplifying a difference between the reference voltage VR and the feedback voltage VFB, and the comparison voltage COMP is generated by compensating for the error voltage using the compensator connected to the pin P10.

The LLC controller 100 includes a count clock generator 110, a clock generator 120, and a primary-side drive controller 130.

The count clock generator 110 generates a count clock signal CCLK for counting a cycle of one of the first and second clock signals CLK1 and CLK2.

The clock generator 120 generates the first and second clock signals CLK1 and CLK2 based on the half cycle signal HS and the frequency limit signal FLS. The clock generator 120 counts the enable period of one of the first and second clock signals CLK1 and CLK2 in the immediately previous switching cycle using the count clock signal CCLK, and generates the first count signal MCNT according to a counting result. The clock generator 120 counts a period from an enable start time point of one of the first and second clock signals CLK1 and CLK2 to a generate time point of the half cycle signal HS using the count clock signal CCLK in the current switching cycle and generates the second count signal CCNT according to a counting result. When the second count signal CCNT is less than the frequency limit signal FLS, the clock generator 120 determines a period according to the frequency limit signal FLS as an enable period of one of the first and second clock signals CLK1 and CLK2. The clock generator 120 may generate the clock signal with the disable period having the same length as the determined enable period and generate another clock signal by inverting the generated clock signal.

For example, the clock generator 120 counts the enable period of the first clock signal CLK1 using the count clock signal CCLK in the immediately previous switching cycle and generates the first count signal MCNT according to the counting result. The clock generator 120 counts a period from a rising time point of the first clock signal CKL1 to a generation time point of the half cycle signal HS in the current switching cycle using the count clock signal CCLK, and generates the second count signal CCNT according to the counting result.

When the second count signal CCNT is less than the frequency limit signal FLS, the clock generator 120 determines a period according to the frequency limit signal FLS as the enable period of the first clock signal CLK1. The clock generator 120 generates the first clock signal CLK1 with the disable period having the same period as the determined enable period, and generates the second clock signal CLK2 by inverting the generated clock signal. Then, the first and second clock signals CLK1 and CLK2 with the same frequency in anti-phase are generated.

However, the present invention is not limited thereto. The clock generator 120 may generate the second clock signal CLK2 based on the half cycle signal HS and generate the first clock signal CLK1 by inverting the second clock signal CLK2.

The clock generator 120 enables the reset signal RS in synchronization with the rising edge of the second clock signal CLK2 and disables the reset signal RS in synchronization with the rising edge of the first clock signal CLK1. When the clock generator 120 generates the first clock signal CLK1 by inverting the second clock signal CLK2 after generating the second clock signal CLK2, the clock generator 120 may enable the reset signal RS in synchronization with the rising edge of the first clock signal CLK1 and disable the reset signal RS in synchronization with the rising edge of the second clock signal CLK2.

The primary-side drive controller 130 receives inputs of the first and second clock signals CLK1 and CLK2 and dead time information DT and generates the first and second drive control signals PDRV1 and PDRV2. For example, the primary-side drive controller 130 generates the first drive control signal PDRV1 having the high level at a point in time at which the dead time according to dead time information DT has elapsed from the rising edge of the first clock signal CLK1 and the low level at the falling edge of the first clock signal CLK1 and generates the second drive control signal PDRV2 having the high level at a point in time at which the dead time has elapsed from the rising edge of the second clock signal CLK2 and the low level at the falling edge of the second clock signal CLK2.

The primary-side driver 300 generates first and second drive voltages PRDRV1 and PRDRV2 having levels capable of driving the first and second switches Q1 and Q2 according to the first and second drive control signals PDRV1 and PDRV2. For example, the primary-side driver 300 generates the first drive voltage PRDRV1 having the high level during the high level period of the first drive control signal PDRV1 and generates the second drive voltage PRDRV2 having the high level during the high level period of the second drive control signal PDRV2.

Hereinafter the frequency limit controller 200 according to the embodiment and its operation will be described in detail with reference to FIGS. 3 and 4.

Figure 3:
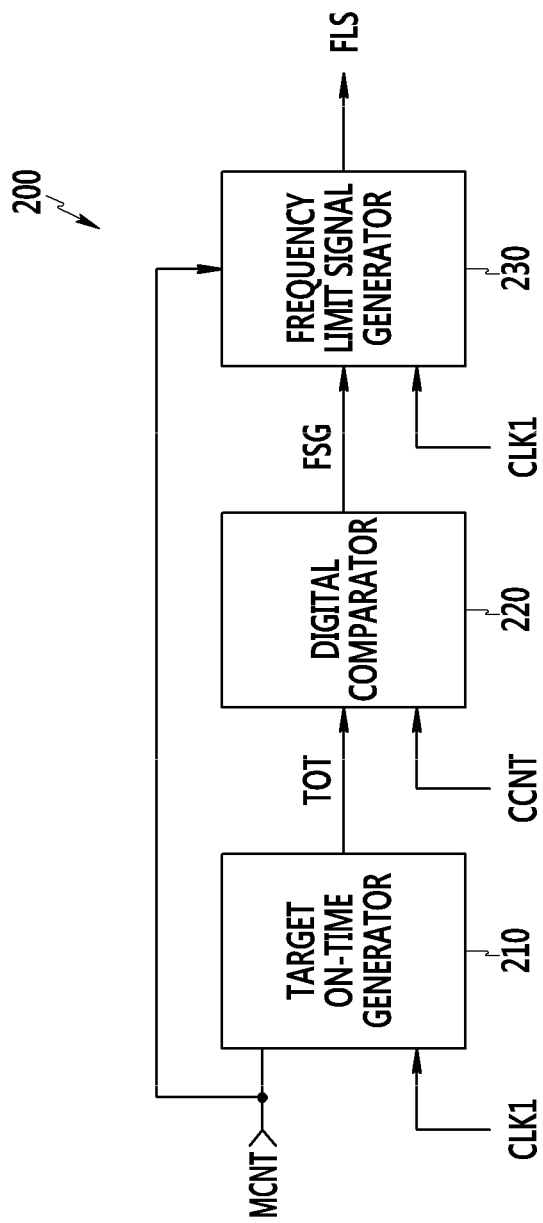
FIG. 3 is a diagram illustrating a frequency limit controller according to an embodiment.

FIG. 3 is a diagram illustrating the frequency limit controller according to the embodiment.

As illustrated in FIG. 3, the frequency limit controller 200 includes a target on-time generator 210, a digital comparator 220, and a frequency limit signal generator 230.

The target on-time generator 210 generates the target on-time signal TOT corresponding to the target on-time by multiplying the first count signal MCNT by the first ratio. The target on-time generator 210 may update the target on-time signal TOT for at least every switching cycle.

For example, the target on-time generator 210 generates the target on-time signal TOT by multiplying the first count signal MCNT input in synchronization with the rising time point of the first clock signal CLK1 by a first ratio. At this time, the first count signal MCNT input in synchronization with the rising time point of the first clock signal CLK1 may be an enable period of the first clock signal CLK1 in a cycle immediately before the rising time point, that is, a maximum on-time period.

The digital comparator 220 compares magnitudes of the target on-time signal TOT and the second count signal CCNT and generates a frequency mode signal FSG according to a comparison result. For example, when the target on-time signal TOT is less than the second count signal CCNT, the digital comparator 220 generates a low-level frequency mode signal FSG indicating the first frequency limit mode. Otherwise, the digital comparator 220 generates a high-level frequency mode signal FSG indicating the second frequency limit mode.

The frequency limit signal generator 230 generates the frequency limit signal FLS based on the first count signal MCNT according to the frequency mode signal FSG. The frequency limit signal generator 230 may update the frequency limit signal FLS for at least every switching cycle. For example, the frequency limit signal generator 230 may generate a first frequency limit signal FL1 (see FIG. 4) by multiplying the first count signal MCNT input in synchronization with a rising time point of the first clock signal CLK1 by the first limit ratio according to the frequency mode signal FSG, generate a second frequency limit signal FL2 (see FIG. 4) by multiplying the first count signal MCNT by the second limit ratio, and generate the frequency limit signal FLS by selecting one of the first and second frequency limit signals FL1 and FL2 according to the frequency mode signal FSG.

Hereinafter, an operation of the frequency limit controller 200 and a method of controlling a frequency of the first clock signal CLK1 will be described with reference to FIG. 4. Because the second clock signal CLK2 is a signal obtained by inverting the first clock signal CLK1, a waveform of the second clock signal CLK2 can be estimated although not illustrated.

Figure 4:
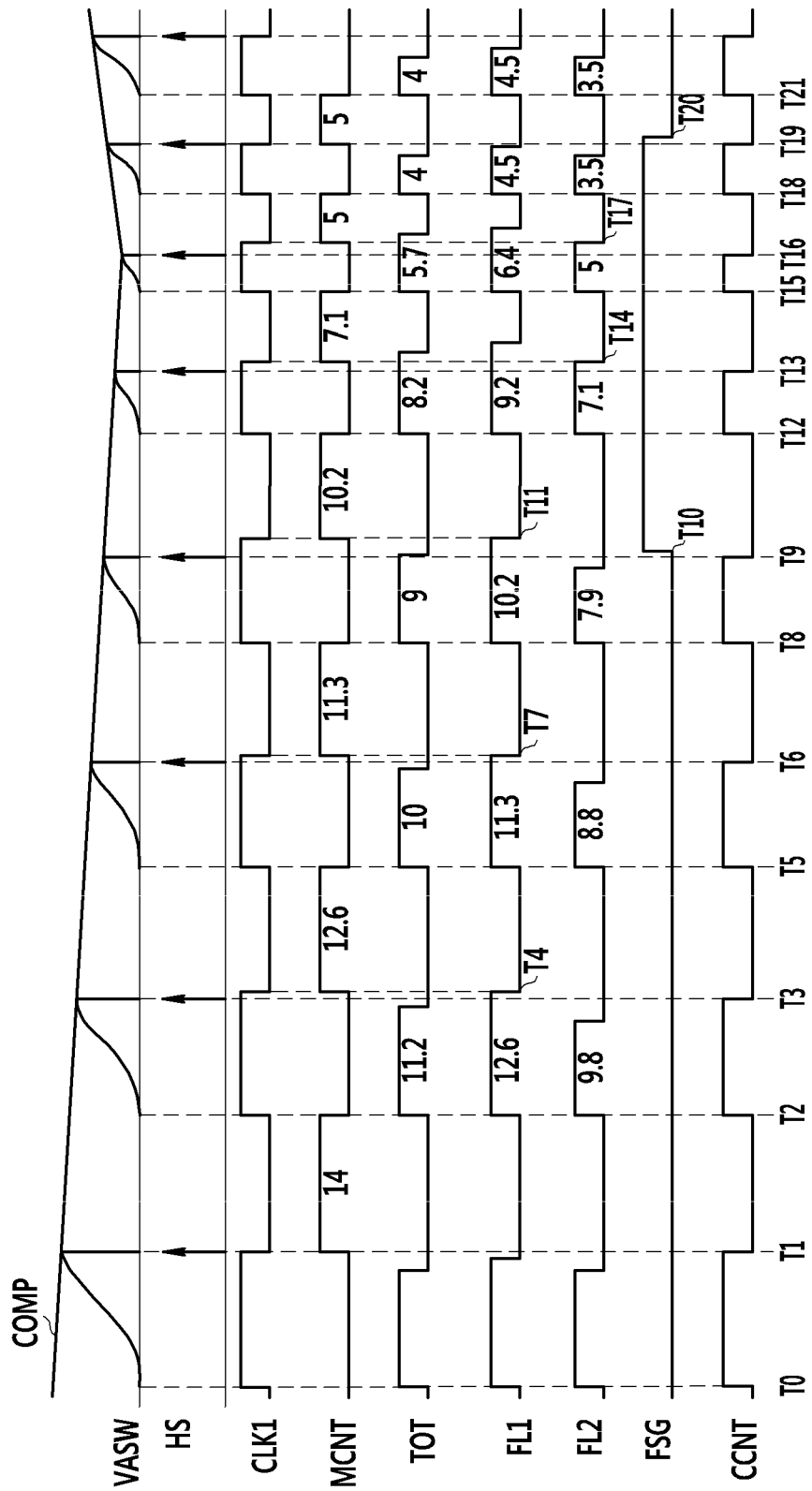
FIG. 4 is a waveform diagram illustrating a comparison voltage, sawtooth waves, a half cycle signal, a first clock signal, first and second count signals, a target on-time signal, a frequency mode signal, and first and second frequency limit signals according to an embodiment.

FIG. 4 is a waveform diagram illustrating a comparison voltage, sawtooth waves, a half cycle signal, a first clock signal, first and second count signals, a target on-time signal, a frequency mode signal, and first and second frequency limit signals according to an embodiment.

In FIG. 4, the waveform of the comparison voltage COMP which increases after a decrease is illustrated to describe the first frequency limit mode and the second frequency limit mode. This is only an example for describing the embodiment, and the present invention is not limited thereto.

Also, in FIG. 4, a period corresponding to the magnitude of each of the first count signal MCNT, the second count signal CCNT, the target on-time signal TOT, and the first and second frequency limit signals FL1 and FL2 is illustrated. These are only an example for describing the embodiment. Each of the first count signal MCNT, the second count signal CCNT, the target on-time signal TOT, and the first and second frequency limit signals FL1 and FL2 is a digital signal indicating a corresponding period. For convenience of description, each of the first count signal MCNT, the second count signal CCNT, the target on-time signal TOT, and the first and second frequency limit signals FL1 and FL2 is illustrated along with a numeral representing the magnitude.

When the first clock signal CLK1 rises at time T0, the first switch Q1 is turned on. Then, the voltage VCT and the current sense voltage VICS start to increase after time T0, and the voltage of the sawtooth waves VSAW increases as illustrated in FIG. 4.

The target on-time signal TOT based on the first count signal MCNT, the first frequency limit signal FL1, and the second frequency limit signal FL2 according to the enable period of the first clock signal CLK1 before time T0 are generated.

When the voltage of the sawtooth waves VSAW reaches the comparison voltage COMP at time T1, the half cycle signal HS is generated. Then, the second count signal CCNT is generated as a digital signal indicating a result of counting a period from T0 to T1. The first count signal MCNT is also generated as a digital signal indicating a result of counting the period from T0 to T1. Its magnitude is indicated by 14.

The clock generator 120 generates the first clock signal CLK1 during the same period as the period from T0 to T1 at the low level and generates the first clock signal CLK1 at the high level at time T2.

The frequency limit controller 200 generates the target on-time signal TOT, the first frequency limit signal FL1, and the second frequency limit signal FL2 by multiplying the first count signal MCNT by the first ratio, the first limit ratio, and the second limit ratio at time T2. For example, the first ratio may be 0.8, the first limit ratio may be 0.9, and the second limit ratio may be 0.7. Then, the target on-time signal TOT, the first frequency limit signal FL1, and the second frequency limit signal FL2 are generated to have magnitudes of 11.2, 12.6, and 9.8, respectively.

At illustrated in FIG. 4, because the magnitude of the second count signal CCNT is greater than that of the target on-time signal TOT, the frequency mode signal FSG is maintained at the low level, and the frequency limit signal FLS is based on the first frequency limit signal FL1. Because the magnitude of the second count signal CCNT is greater than that of the frequency limit signal FLS, the enable period of the first clock signal CLK1 is determined according to the half cycle signal HS.

The voltage of the sawtooth waves VSAW starts to increase after time T2, the voltage of the sawtooth waves VSAW reaches the comparison voltage COMP at time T3, and the half cycle signal HS is generated. Then, the second count signal CCNT is generated as a digital signal indicating a result of counting a period from T2 to T3.

As illustrated in FIG. 4, because the magnitude of the second count signal CCNT is greater than that of the target on-time signal TOT, the frequency mode signal FSG is maintained at the low level, and the frequency limit signal FLS is based on the first frequency limit signal FL1. Because the magnitude of the second count signal CCNT is less than that of the frequency limit signal FLS, the enable period of the first clock signal CLK1 is determined according to the frequency limit signal FLS. That is, the first clock signal CLK1 falls to the low level at time T4.

Then, the first count signal MCNT is generated as a digital signal indicating a result of counting a period from T2 to T4. The magnitude of the first count signal MCNT is indicated to be 12.6 which is the same as the magnitude of the frequency limit signal FLS. The clock generator 120 generates the first clock signal CLK1 at the low level during the same period as the period from T2 to T4 and generates the first clock signal CLK1 at the high level at time T5.

The frequency limit controller 200 generates the target on-time signal TOT, the first frequency limit signal FL1, and the second frequency limit signal FL2 by multiplying the first count signal MCNT by the first ratio, the first limit ratio, and the second limit ratio at time T5. Then, the target on-time signal TOT, the first frequency limit signal FL1, and the second frequency limit signal FL2 are generated to have magnitudes of 10, 11.3, and 8.8, respectively.

The voltage of the sawtooth waves VSAW starts to increase after time T5, the voltage of the sawtooth waves VSAW reaches the comparison voltage COMP at time T6, and the half cycle signal HS is generated. Then, the second count signal CCNT is generated as a digital signal indicating a result of counting a period from T5 to T6.

As illustrated in FIG. 4, because the magnitude of the second count signal CCNT is greater than that of the target on-time signal TOT, the frequency mode signal FSG is maintained at the low level, and the frequency limit signal FLS is based on the first frequency limit signal FL1. Because the magnitude of the second count signal CCNT is less than that of the frequency limit signal FLS, the enable period of the first clock signal CLK1 is determined according to the frequency limit signal FLS. That is, the first clock signal CLK1 falls to the low level at time T7.

Then, the first count signal MCNT is generated as a digital signal indicating a result of counting a period from T5 to T7. The magnitude of the first count signal MCNT is indicated to be 11.3 which is the same as the magnitude of the frequency limit signal FLS. The clock generator 120 generates the first clock signal CLK1 at the low level during the same period as the period from T5 to T7 and generates the first clock signal CLK1 at the high level at time T8.

The frequency limit controller 200 generates the target on-time signal TOT, the first frequency limit signal FL1, and the second frequency limit signal FL2 by multiplying the first count signal MCNT by the first ratio, the first limit ratio, and the second limit ratio at time T8. Then, the target on-time signal TOT, the first frequency limit signal FL1, and the second frequency limit signal FL2 are generated to have magnitudes of 9, 10.2, and 7.9, respectively.

The voltage of the sawtooth waves VSAW starts to increase after time T8, the voltage of the sawtooth waves VSAW reaches the comparison voltage COMP at time T9, and the half cycle signal HS is generated. Then, the second count signal CCNT is generated as a digital signal indicating a result of counting a period from T8 to T9.

As illustrated in FIG. 4, because the magnitude of the second count signal CCNT is less than that of the target on-time signal TOT, the frequency mode signal FSG rises to the high level at time T10. In FIG. 4, a point in time at which the digital comparator 220 determines that a value of the target on-time signal TOT is greater than a value of the second count signal CCNT is indicated to be T10.

Because the frequency limit signal FLS is updated in synchronization with a rising time point of the first clock signal CLK1, the frequency limit signal FLS is maintained as the first frequency limit signal FL1 before the next rising time T12 of the first clock signal CLK1 is reached.

Because the magnitude of the second count signal CCNT is less than that of the frequency limit signal FLS, the enable period of the first clock signal CLK1 is determined according to the frequency limit signal FLS. That is, the first clock signal CLK1 falls to the low level at time T11.

Then, the first count signal MCNT is generated as a digital signal indicating a result of counting a period from T8 to T11. The magnitude of the first count signal MCNT is indicated to be 10.2 which is the same as the magnitude of the frequency limit signal FLS. The clock generator 120 generates the first clock signal CLK1 at the low level during the same period as the period from T8 to T11 and generates the first clock signal CLK1 at the high level at time T12.

The frequency limit controller 200 generates the target on-time signal TOT, the first frequency limit signal FL1, and the second frequency limit signal FL2 by multiplying the first count signal MCNT by the first ratio, the first limit ratio, and the second limit ratio at time T12. Then, the target on-time signal TOT, the first frequency limit signal FL1, and the second frequency limit signal FL2 are generated to have magnitudes of 8.2, 9.2, and 7.1, respectively. Also, the frequency limit signal FLS is based on the second frequency limit signal FL2 according to the second frequency limit mode.

The voltage of the sawtooth waves VSAW starts to increase after time T12, the voltage of the sawtooth waves VSAW reaches the comparison voltage COMP at time T13, and the half cycle signal HS is generated. Then, the second count signal CCNT is generated as a digital signal indicating a result of counting a period from T12 to T13.

As illustrated in FIG. 4, because the magnitude of the second count signal CCNT is less than that of the target on-time signal TOT, the frequency mode signal FSG is maintained at the high level.

Because the magnitude of the second count signal CCNT is less than that of the frequency limit signal FLS, the enable period of the first clock signal CLK1 is determined according to the frequency limit signal FLS. That is, the first clock signal CLK1 falls to the low level at time T14.

Then, the first count signal MCNT is generated as a digital signal indicating a result of counting a period from T12 to T14. The magnitude of the first count signal MCNT is indicated to be 7.1 which is the same as the magnitude of the frequency limit signal FLS. The clock generator 120 generates the first clock signal CLK1 at the low level during the same period as the period from T12 to T14 and generates the first clock signal CLK1 at the high level at time T15.

The frequency limit controller 200 generates the target on-time signal TOT, the first frequency limit signal FL1, and the second frequency limit signal FL2 by multiplying the first count signal MCNT by the first ratio, the first limit ratio, and the second limit ratio at time T15. Then, the target on-time signal TOT, the first frequency limit signal FL1, and the second frequency limit signal FL2 are generated to have magnitudes of 5.7, 6.4, and 5, respectively. Also, the frequency limit signal FLS is based on the second frequency limit signal FL2 according to the second frequency limit mode.

The voltage of the sawtooth waves VSAW starts to increase after time T15, the voltage of the sawtooth waves VSAW reaches the comparison voltage COMP at time T16, and the half cycle signal HS is generated. Then, the second count signal CCNT is generated as a digital signal indicating a result of counting a period from T15 to T16.

As illustrated in FIG. 4, because the magnitude of the second count signal CCNT is less than that of the target on-time signal TOT, the frequency mode signal FSG is maintained at the high level.

Because the magnitude of the second count signal CCNT is less than that of the frequency limit signal FLS, the enable period of the first clock signal CLK1 is determined according to the frequency limit signal FLS. That is, the first clock signal CLK1 falls to the low level at time T17.

Then, the first count signal MCNT is generated as a digital signal indicating a result of counting a period from T15 to T17. The magnitude of the first count signal MCNT is indicated to be 5 which is the same as the magnitude of the frequency limit signal FLS. The clock generator 120 generates the first clock signal CLK1 at the low level during the same period as the period from T15 to T17 and generates the first clock signal CLK1 at the high level at time T18.

The frequency limit controller 200 generates the target on-time signal TOT, the first frequency limit signal FL1, and the second frequency limit signal FL2 by multiplying the first count signal MCNT by the first ratio, the first limit ratio, and the second limit ratio at time T18. Then, the target on-time signal TOT, the first frequency limit signal FL1, and the second frequency limit signal FL2 are generated to have magnitudes of 4, 4.5, and 3.5, respectively. Also, the frequency limit signal FLS is based on the second frequency limit signal FL2 according to the second frequency limit mode.

The comparison voltage COMP starts to increase from time T16.

The voltage of the sawtooth waves VSAW starts to increase after time T18, the voltage of the sawtooth waves VSAW reaches the comparison voltage COMP at time T19, and the half cycle signal HS is generated. Then, the second count signal CCNT is generated as a digital signal indicating a result of counting a period from T18 to T19.

As illustrated in FIG. 4, because the magnitude of the second count signal CCNT is greater than that of the target on-time signal TOT, the frequency mode signal FSG falls to the low level at time T20. In FIG. 4, a point in time at which the digital comparator 220 determines that a value of the second count signal CCNT is greater than that of the target on-time signal TOT is indicated to be T20.

Because the frequency limit signal FLS is updated in synchronization with a rising time point of the first clock signal CLK1, the frequency limit signal FLS is maintained as the second frequency limit signal FL2 before the next rising time T21 of the first clock signal CLK1 is reached.

Because the magnitude of the second count signal CCNT is greater than that of the frequency limit signal FLS, the enable period of the first clock signal CLK1 is determined according to a generation time point of the half cycle signal HS. That is, the first clock signal CLK1 falls to the low level at time T19.

Then, the first count signal MCNT is generated as a digital signal indicating a result of counting a period from T18 to T19. For example, the magnitude of the first count signal MCNT is indicated to be 5. The clock generator 120 generates the first clock signal CLK1 at the low level during the same period as the period from T18 to T19 and generates the first clock signal CLK1 at the high level at time T21.

The frequency limit controller 200 generates the target on-time signal TOT, the first frequency limit signal FL1, and the second frequency limit signal FL2 by multiplying the first count signal MCNT by the first ratio, the first limit ratio, and the second limit ratio at time T21. Then, the target on-time signal TOT, the first frequency limit signal FL1, and the second frequency limit signal FL2 are generated to have magnitudes of 4, 4.5, and 3.5, respectively.

Although the case in which the frequency limit controller 200 determines the frequency limit mode in a unit of one cycle of the first clock signal CLK1 in synchronization with the first clock signal CLK1 has been described above, the present invention is not limited thereto. The determination of the frequency limit mode may be made for every cycle of the second clock signal CLK2 rather than the first clock signal CLK1 or at least for every two cycles of one of the first and second clock signals CLK1 and CLK2.

Conventionally, a minimum switching frequency is determined by the resistor Rmin. However, it is possible to digitally make a switching frequency limit condition different regardless of a resistance value of the resistor Rmin in the resonant converter according to the embodiment.

A regular limit is required to control a switching frequency according to variation of the comparison voltage COMP when the comparison voltage COMP varies according to input voltage or load variation. Otherwise, a subharmonic may be caused by frequency distortion. It is possible to control an operation of the resonant converter by reflecting variation of the comparison voltage COMP while preventing sub-harmonic oscillation by making the frequency limit ratio variable according to variation of the comparison voltage COMP.

In this manner, when the frequency limit ratio is differently controlled according to variation of the comparison voltage COMP according to input voltage or load variation, it is possible to control an operation of the resonant converter by reflecting variation of the comparison voltage COMP while preventing the sub-harmonic oscillation regardless of the resistor Rmin. Also, it is possible to suppress noise occurrence in a digital scheme using a digital signal.

While an exemplary embodiment of the invention has been described in detail above, the protection scope of the present invention is not limited to the foregoing embodiment, and it will be appreciated by those skilled in the art that various modifications and improvements using the basic concept of the invention defined in the appended claims are also included in the protection scope of the present invention.

DESCRIPTION OF THE REFERENCE NUMERALS

1: Resonant converter
Q1: First switch
Q2: Second switch
20: Transformer
30: Gate drive circuit
SR1: First synchronous rectification switch
SR2: Second synchronous rectification switch
10: Switch control circuit
100: LLC controller
200: Frequency limit controller
210: Target on-time generator
220: Digital comparator
230: Frequency limit signal generator
300: Primary-side driver
400: Half cycle signal generator

What is claimed is:

1. A switch control circuit for controlling switching operations of first and second switches that control power supply of a resonant converter, the switch control circuit comprising:
    a half cycle signal generator to generate a half cycle signal according to a result of comparing a comparison voltage corresponding to an output voltage of the resonant converter to a first signal based on a current sense voltage according to a load of the resonant converter; and
    a frequency limit controller to differently limit a variation ratio of a frequency of a first clock signal according to a result of comparing a target on-time based on a first enable period in a previous switching cycle of a first clock signal for determining switching frequencies of the first and second switches to a first period beginning from an enable start time point of the first clock signal and ending at a point in time at which the half cycle signal is generated.

2. The switch control circuit according to claim 1,
    wherein the frequency limit controller is to generate a first frequency limit signal by multiplying the first enable period by a predetermined first limit ratio and generate a second frequency limit signal by multiplying the first enable period by a predetermined second limit ratio less than the first limit ratio, and
    wherein the frequency limit controller is to select the second frequency limit signal when the first period is shorter than the target on-time and select the first frequency limit signal when the first period is longer than the target on-time.

3. The switch control circuit according to claim 2, wherein the frequency limit controller comprises:
    a target on-time generator to generate a target on-time signal corresponding to the target on-time by multiplying a first count signal corresponding to the first enable period by a predetermined first ratio;
    a digital comparator to select one of first and second frequency limit modes according to a result of comparing a second count signal corresponding to the first period to the target on-time signal; and
    a frequency limit signal generator to generate the first and second frequency limit signals by multiplying the first count signal by the first limit ratio and the second limit ratio and output a frequency limit signal by selecting one of the first and second frequency limit signals according to the selected frequency limit mode.

4. The switch control circuit according to claim 3,
    wherein the target on-time generator is to update the target on-time signal for at least every switching cycle.

5. The switch control circuit according to claim 3, wherein the frequency limit signal generator is to update the frequency limit signal for at least every switching cycle.

6. The switch control circuit according to claim 3, further comprising:
    a clock signal generator to generate the first and second count signals by counting the first enable period and the first period, respectively, and generate the first clock signal according to one of the half cycle signal and the frequency limit signal.

7. The switch control circuit according to claim 6, wherein the clock signal generator determines an enable period of the first clock signal as a period based on the frequency limit signal when the first period is shorter than the period based on the frequency limit signal.

8. The switch control circuit according to claim 1,
wherein the frequency limit controller generates a frequency limit signal according to a selected mode of a first frequency limit mode and a second frequency limit mode according to the result of comparing the target on-time to the first period, and
wherein the frequency limit controller controls an enable period of the first clock signal to at least a limit period based on the frequency limit signal.

9. The switch control circuit according to claim 8,
wherein the frequency limit controller is to select the first frequency limit mode when the first period is longer than the target on-time and select the second frequency limit mode when the first period is shorter than the target on-time, and
wherein a first limit period based on a frequency limit signal according to the first frequency limit mode is longer than a second limit period based on a frequency limit signal according to the second frequency limit mode.

10. The switch control circuit according to claim 9, wherein the frequency limit controller generates a frequency limit signal by multiplying the first enable period by a first limit ratio corresponding to the first limit period and generates a frequency limit signal by multiplying the first enable period by a second limit ratio corresponding to the second limit period.

11. The switch control circuit according to claim 1, wherein the half cycle signal generator generates the half cycle signal at a point in time at which the first signal has reached the comparison voltage.

12. A resonant converter comprising:
a primary-side winding electrically coupled to an input voltage;
a secondary-side winding electrically coupled to a load;
first and second switches coupled to one end of the primary-side winding; and
a switch control circuit to differently limit a frequency variation ratio of a first clock signal that determines switching frequencies of the first and second switches according to variation of one of the input voltage and the load in a frequency limit mode where it is necessary to limit degree of variation of the switching frequencies due to the input voltage or load variation so as to differently control switching frequency limit ratios of the first and second switches,
wherein the switching frequency limit ratios of the first and second switches mean the degree of variation of the switching frequencies.

13. The resonant converter according to claim 12, wherein the switch control circuit comprises:
a half cycle signal generator to generate a half cycle signal according to a result of comparing a comparison voltage corresponding to an output voltage of the resonant converter to a first signal based on a current sense voltage according to a load of the resonant converter; and
a frequency limit controller to differently limit a variation ratio of a frequency of the first clock signal according to a result of comparing a target on-time based on a first enable period in a previous switching cycle of the first clock signal to a first period beginning from an enable start time point of the first clock signal and ending at a point in time at which the half cycle signal is generated.

14. The resonant converter according to claim 13,
wherein the frequency limit controller is to generate a first frequency limit signal by multiplying the first enable period by a predetermined first limit ratio and generate a second frequency limit signal by multiplying the first enable period by a predetermined second limit ratio less than the first limit ratio, and
wherein the frequency limit controller is to select the second frequency limit signal when the first period is shorter than the target on-time and select the first frequency limit signal when the first period is longer than the target on-time.

15. The resonant converter according to claim 14, wherein the frequency limit controller comprises:
a target on-time generator to generate a target on-time signal corresponding to the target on-time by multiplying a first count signal corresponding to the first enable period by a predetermined first ratio;
a digital comparator to select one of a first frequency mode and a second frequency limit mode according to a result of comparing a second count signal corresponding to the first period to the target on-time signal; and
a frequency limit signal generator to generate the first and second frequency limit signals by multiplying the first count signal by the first limit ratio and the second limit ratio and output a frequency limit signal by selecting one of the first and second frequency limit signals according to the selected frequency limit mode.

16. The resonant converter according to claim 15, wherein the switch control circuit further comprises:
a clock signal generator to generate the first and second count signals by counting the first enable period and the first period, respectively and generate the first clock signal according to one of the half cycle signal and the frequency limit signal.

17. The resonant converter according to claim 16, wherein the clock signal generator determines an enable period of the first clock signal as a period based on the frequency limit signal when the first period is shorter than the period based on the frequency limit signal.

18. The resonant converter according to claim 13,
wherein the frequency limit controller is to generate a frequency limit signal according to a selected mode of a first frequency limit mode and a second frequency limit mode according to the result of comparing the target on-time to the first period, and
wherein the frequency limit controller is to control an enable period of the first clock signal to at least a limit period based on the frequency limit signal.

19. The resonant converter according to claim 18,
wherein the frequency limit controller is to select the first frequency limit mode when the first period is longer than the target on-time and select the second frequency limit mode when the first period is shorter than the target on-time, and
wherein a first limit period based on a frequency limit signal according to the first frequency limit mode is longer than a second limit period based on a frequency limit signal according to the second frequency limit mode.

20. The resonant converter according to claim 19,
wherein the frequency limit controller is to generate a frequency limit signal by multiplying the first enable period by a first limit ratio corresponding to the first limit period and generate a frequency limit signal by multiplying the first enable period by a second limit ratio corresponding to the second limit period.

\* \* \* \* \*